United States Patent [19]
Grupp et al.

[11] Patent Number: 5,894,916
[45] Date of Patent: Apr. 20, 1999

[54] FRICTION CLUTCH

[75] Inventors: Matthias Grupp, Bühl-Neusatz; Karl-Ludwig Kimmig, Bühl-Waldmatt, both of Germany

[73] Assignee: Luk Lamellen Und Kupplungbau GmbH, Buhl, Germany

[21] Appl. No.: 08/859,641

[22] Filed: May 20, 1997

[30] Foreign Application Priority Data

May 24, 1996 [DE] Germany .................. 196 21 123

[51] Int. Cl.⁶ .................................................. F16D 13/75
[52] U.S. Cl. ............................. 192/70.25; 192/111 A
[58] Field of Search .................. 192/70.25, 11 A, 192/109 A, 70.28, 30 V

[56] References Cited

U.S. PATENT DOCUMENTS

| | | | |
|---|---|---|---|
| 4,141,441 | 2/1979 | Fukutani | 192/70.25 |
| 4,478,324 | 10/1984 | Sink | 192/30 V X |
| 4,727,970 | 3/1988 | Reik et al. | |
| 5,236,070 | 8/1993 | Simoncic et al. | 192/70.28 |
| 5,641,048 | 6/1997 | Gaisberg | 192/70.25 |

FOREIGN PATENT DOCUMENTS

| | | |
|---|---|---|
| 42 39 289 A 1 | 5/1993 | Germany . |
| 42 39 291 A 1 | 5/1993 | Germany . |
| 43 22 677 A 1 | 1/1994 | Germany . |
| 195 41 172 A 1 | 5/1996 | Germany . |

*Primary Examiner*—Rodney H. Bonck
*Attorney, Agent, or Firm*—Darby&Darby

[57] ABSTRACT

A friction clutch wherein stray axial and/or radial and/or angular movements of the pressure plate relative to the counterpressure plate, clutch disc, clutch housing and/or clutch spring are opposed by a damper having prestressed resilient portions forming part of a sensor, which latter abuts the clutch spring, and bearing against a finished, partly finished or rough-finished internal surface of the pressure plate. The sensor forms part of a unit which automatically compensates for wear upon the pressure plate, counterpressure plate, clutch spring and/or friction linings of the clutch disc in response to repeated engagement and disengagement of the friction clutch.

39 Claims, 3 Drawing Sheets

5,894,916

FRICTION CLUTCH

BACKGROUND OF THE INVENTION

The present invention relates to improvements in friction clutches in general, and more particularly to improvements in friction clutches which can be employed with advantage in power trains between the prime movers (such as combustion engines) and manual, automated or automatic transmissions and/or other driven (such as torque-receiving or torque transmitting) units (e.g., differentials, wheel axles and/or auxiliary aggregates) of motor vehicles.

It is well known to transmit torque from the output element, (such as a crankshaft or a camshaft) of a combustion engine to the input element (e.g., a shaft) of a transmission by way of a friction clutch wherein a counterpressure plate (such as a simple flywheel or a composite flywheel having coaxial primary and secondary masses rotatable relative to each other against the opposition of one or more dampers) carries a housing for a clutch spring (e.g., a diaphragm spring) serving to bias an axially movable pressure plate against a clutch disc or clutch plate which is thereby urged against and is rotated by the counterpressure plate. The clutch spring can be acted upon by a bearing or the like to at least partially engage or disengage the clutch, when necessary, and the clutch can further comprise a suitable compensating unit which can move (when necessary) the pressure plate away from the housing and toward the counterpressure plate to thus account for wear upon the friction surfaces of the pressure plate and the counterpressure plate and/or upon the friction linings of the clutch disc.

Reference may be had to the disclosures of U.S. Pat. Nos. 5,450,934 and 5,409,091, which disclose friction clutches of the above outlined character. The compensating unit can be installed between the housing and the clutch spring (such as the aforementioned diaphragm spring) or in the power flow between the pressure plate and the clutch spring. The disclosures of the above U.S. Pat. Nos. are incorporated herein by reference.

A drawback of certain presently known friction clutches is that they can at times adversely affect the shifting into different gears of the transmission and/or the convenience of partially or fully engaging or disengaging the clutch, particularly during certain stages of utilization or operation of a motor vehicle wherein the power train between the prime mover and the transmission and/or other driven unit or units embodies a friction clutch. This holds particularly true during and immediately or shortly following the starting of the engine, during and immediately or shortly preceding the stoppage of the engine, as well as in response to abrupt changes of the position of the gas pedal. For example, the pressure plate is likely to perform high-frequency vibratory or oscillatory movements which, in the absence of any undertakings to the contrary, can be transmitted to the housing and/or to other constituents of the clutch and/or to the unit or units which are to receive torque from the engine of a motor vehicle when the friction clutch is at least partially engaged. The aforementioned vibratory or oscillatory movements can be initiated by the axial oscillations and/or by the bending or flexing of the crankshaft or the camshaft of the engine, i.e., of that part which transmits torque to the input element of the friction clutch. Undesirable stray movements of the pressure plate and/or of one or more constituents in a friction clutch which is installed in the power train of a motor vehicle are also likely to arise due to inertia of certain parts which are subject to the action of one or more vibratory constituents of a combustion engine and/or which arise when the magnitude and/or the nature of the load upon a motor vehicle undergoes an abrupt and/or a pronounced or highly pronounced change.

OBJECTS OF THE INVENTION

An object of the invention is to provide a friction clutch which contributes to the comfort of the occupant or occupants if it is installed in the power train between the prime mover (such as an internal combustion engine) and one or more driven units or aggregates of a motor vehicle.

Another object of the invention is to provide a friction clutch can be constructed, assembled and installed to reduce noise and/or vibratory and/or other undesirable stray movements when utilized in the power train of a motor vehicle.

A further object of the invention is to provide a friction clutch which can more efficiently and more reliably damp stray movements which a camshaft or a crankshaft tends to transmit from the engine to the transmission and/or to one or more other torque receiving constituents or aggregates in the power train of a motor vehicle than a conventional clutch.

An additional object of the invention is to provide the friction clutch with novel and improved means for at least reducing stray movements of the pressure plate in an environment wherein the pressure plate cooperates with a counterpressure plate (such as a simple flywheel or a composite flywheel) to transmit torque to, or to receive torque from, a clutch disc or clutch plate when the clutch is at least partially engaged.

Still another object of the invention is to provide a novel and improved method of damping vibrations and/or other undesirable stray movements of one or more or all constituents of a friction clutch of the type wherein the clutch is engaged when the friction linings of a rotary clutch disc or clutch plate are clamped between an axially movable pressure plate and an engine-driven counterpressure plate.

A further object of the invention is to provide a power train which embodies a friction clutch of the above outlined character.

Another object of the invention is to provide a motor vehicle wherein the power train between the prime mover and one or more torque-receiving units and/or aggregates comprises a friction clutch of the above outlined character.

An additional object of the invention is to provide a novel and improved unit which can be utilized to compensate for wear at least upon the friction linings of the clutch plate or clutch disc in a friction clutch for use in the power train of a motor vehicle.

Still another object of the invention is to provide a novel and improved seat assembly for the clutch spring (such as a tiltable diaphragm spring) in a friction clutch which can be utilized with advantage between the rotary output element of a prime mover and the rotary input element(s) of one or more torque receiving or torque transmitting units (such as a manual, automated or automatic transmission and/or one or more auxiliary aggregates) of a motor vehicle.

A further object of the invention is to provide a friction clutch which can be utilized as a superior (such as more versatile) substitute for heretofore known friction clutches, particularly in the power trains of motor vehicles.

Another object of the invention is to provide a friction clutch which is constructed and which is assembled in such a way that the likelihood of accidental (unnecessary or undesirable) compensation for wear upon the friction linings of its clutch disc (and for wear on the friction surface of the pressure plate and/or counterpressure plate) is at least greatly reduced or eliminated.

An additional object of the invention is to provide a friction clutch wherein unintentional (such as accidental or unnecessary) compensation for wear upon the pressure plate, the counterpressure plate, the clutch spring and/or the friction linings of the clutch disc is prevented in a simple, space-saving and inexpensive manner.

SUMMARY OF THE INVENTION

The invention resides in the provision of an engageable and disengageable friction clutch which comprises a cover or housing, a counterpressure plate (such as a simple or a composite flywheel) which is rotatable with the housing about a common axis, a pressure plate which is rotatable with the housing and has a limited freedom of movability between the housing and the counterpressure plate in the direction of the common axis, at least one clutch spring which reacts (either directly or by way of a seat) against the housing and serves to bias the pressure plate axially toward the counterpressure plate to thus clamp a rotary clutch disc between the two plates in the engaged condition of the clutch, and means for engaging and disengaging the clutch. At least one of the two plates and/or the clutch disc is subject to wear in response to repeated engagement and disengagement of the clutch, and the latter further comprises means for compensating for such wear. The compensating means can comprise means for shifting the pressure plate relative to the housing and, in accordance with a feature of the invention, the clutch further comprises means for damping the movements of the pressure plate in the direction of the common axis.

The counterpressure plate can be provided with means (such as a wall extending substantially radially of the common axis) for receiving torque from a prime mover of a motor vehicle, e.g., from the crankshaft or camshaft of an internal combustion engine.

As a rule, the clutch disc comprises friction linings which are contacted by the two plates at least in the engaged condition of the clutch and are subject to wear in response to repeated engagement and disengagement of the clutch. In many (if not most) instances, the friction linings are subjected to more pronounced wear than the friction surfaces of the two plates, i.e., a compensation for wear is particularly important or effective to account for the normally pronounced wear upon the friction linings of the clutch disc.

The means for damping comprises (or can comprise) at least one friction damper. For example, the means for damping can comprise one or more resilient parts which are mounted on one of the plates or on the clutch spring and bear upon the axially movable pressure plate.

The at least one clutch spring can comprise a diaphragm spring; such diaphragm spring can include resilient portions which form part of the means for engaging and disengaging the clutch. For example, the diaphragm spring can include a circumferentially complete radially outer portion which serves to bias the pressure plate at least in the engaged condition of the clutch, and the resilient portions can include or constitute elastic prongs or tongues extending from the radially outer portion at least substantially radially inwardly toward the common axis. A seat assembly can be provided to tiltably mount the diaphragm spring on the housing radially inwardly of the radially outer portion of the diaphragm spring, i.e., radially inwardly of that portion which bears upon the pressure plate at least in the engaged condition of the clutch.

In accordance with a feature of the invention, the seat assembly which movably (particularly tiltably) mounts the diaphragm spring on the housing includes at least one component which forms part of the aforementioned compensating means. Such seat assembly can include a plurality of seats which flank a portion of the clutch spring, and one of these seats can include or constitute the aforementioned component which forms part of the compensating means; such component can include or constitute or form part of a resilient sensor of the compensating means. For example, the just discussed component of the one seat can include or constitute a diaphragm spring The means for damping can include a resilient sensor (such as the aforementioned sensor of the one seat) which forms part of the compensating means. This resilient sensor can include tongues or prongs which abut a portion of the pressure plate.

In accordance with a presently preferred embodiment, the means for damping includes an insert or intermediate member which is provided in the housing and contacts the pressure plate. Such insert can consist, at least in part, of a metallic sheet material and can include tongues, prongs or analogous projections or protuberances which are resilient and are installed in the housing in a prestressed condition as seen radially of the common axis; these prongs bear upon the pressure plate. The insert can be disposed between the at least one clutch spring and the aforementioned resilient sensor of the compensating means. A friction clutch wherein the means for damping employs the aforediscussed insert is further provided with means for confining the insert to rotation with the housing and/or with the at least one clutch spring; the means for confining can comprise at least one projection provided on the insert and extending into a window, slot or another suitable opening or recess of the at least one clutch spring. The improved friction clutch then further comprises means (e.g., one or more rivets) for non-rotatably coupling the at least one clutch spring to the housing.

As mentioned above, the means for damping can comprise at least one resilient portion which is stressed substantially radially of the common axis and bears upon the pressure plate with a force of, for example, between about 200 and 2000N, particularly between about 400 and 1000N.

That portion or those portions of the means for damping which engages or engage the pressure plate preferably exhibits or exhibit a resistance to deformation in the direction of the common axis. The just mentioned portion or portions of the means for damping can form part of the aforementioned insert which can include or constitute a diaphragm spring. The insert can constitute a substantially cupped (such as a hollow frustoconical) body. The stiffness of the pressure plate engaging portion or portions of the means for damping can be selected in such a way that this portion or these portions can reliably resist deformation by a force close to or exceeding (even considerably exceeding) 500N.

That portion of the pressure plate which is being contacted by the portion or portions of the means for damping can be unfinished or finished. For example, the finish can be the result of treatment by at least one turning tool in a lathe or another suitable machine.

The friction clutch can comprise one or more leaf springs which axially movably but non-rotatably connect the pressure plate to the housing. The leaf spring or springs are preferably stressed to bias or urge the pressure plate in the direction of the common axis away from engagement with the adjacent linings of the clutch disc. The arrangement is or can be such that the leaf spring or springs biases or bias the pressure plate with a first force and that the means for damping includes means for generating a frictional force whch acts upon the pressure plate at least substantially in parallel with the first force.

The aforementioned leaf spring or leaf springs forms or form part of resilient means for maintaining the pressure plate at least substantially out of contact with the clutch disc in the disengaged condition of the friction clutch; such resilient means can further comprise at least one yoke which acts upon the pressure plate at least substantially in parallel with the leaf spring or leaf springs. The resilient means for biasing the pressure plate can bear directly upon the at least one clutch spring (such as the aforementioned diaphragm spring including prongs or tongues which form part of the means for engaging and disengaging the friction clutch).

The at least one clutch spring can bear directly upon the pressure plate, at least in the engaged condition of the friction clutch. Alternatively, the clutch can be provided with a discrete substantially annular component (such as a circumferentially complete or split wire ring) which is interposed between the pressure plate and the at least one clutch spring.

The means for damping can be provided with means for frictionally engaging the pressure plate with a force which is taken up by the at least one clutch spring (such as the aforementioned diaphragm spring which reacts against the housing (with or without the interposition of a seat) and bears upon the pressure plate at least when the clutch is at least partially engaged).

The novel features which are considered as characteristic of the invention are set forth in particular in the appended claims. The improved friction clutch itself, however, both as to its construction, its mode of operation and the mode of installing the same, together with numerous additional important features and advantages thereof, will be best understood upon perusal of the following detailed description of certain presently preferred specific embodiments with reference to the accompanying drawings.

DESCRIPTION OF PREFERRED EMBODIMENTS

Figure 1:
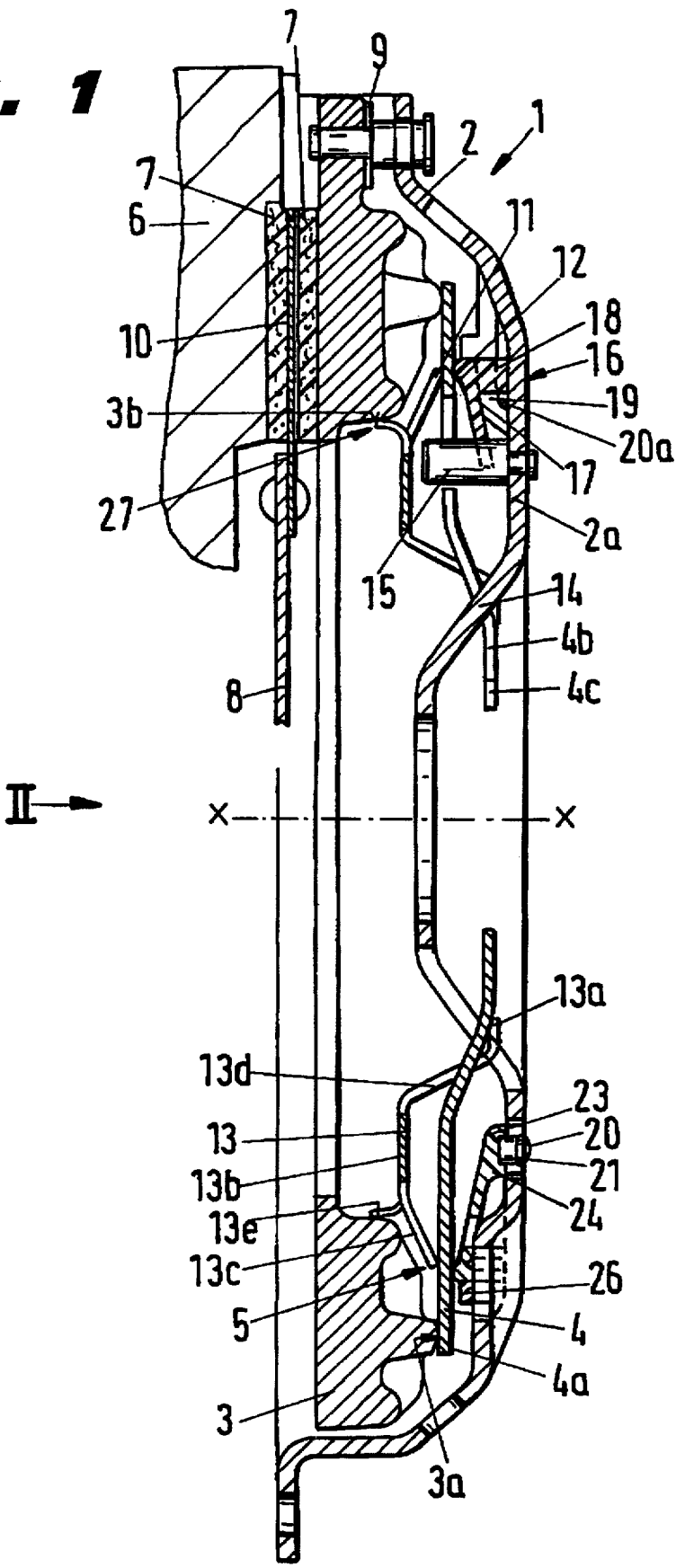
FIG. 1 is an axial sectional view of a friction clutch which embodies one form of the invention.
Figure 2:
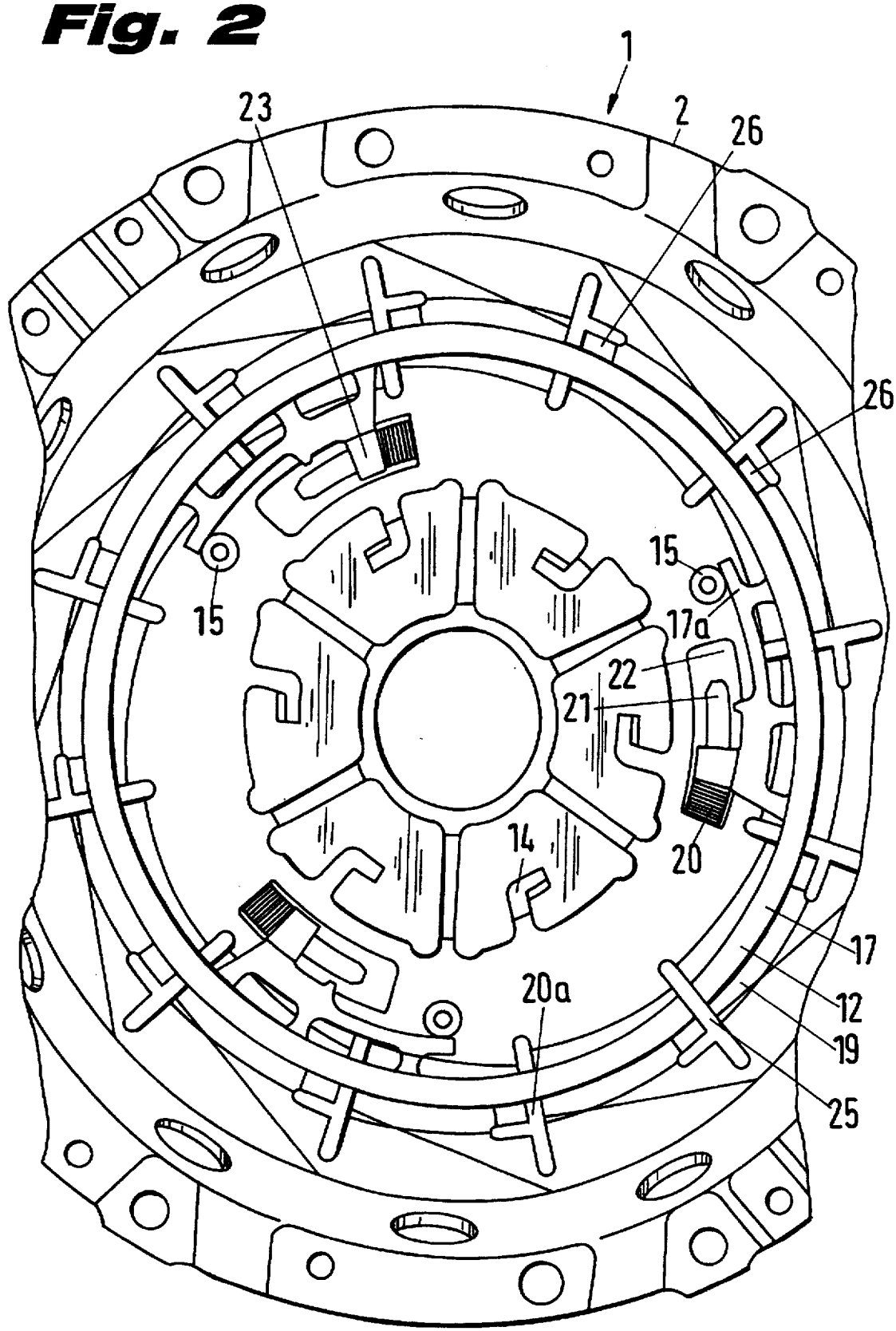
FIG. 2 is an elevational view substantially as seen in the direction of arrow II in FIG. 1 but with the pressure plate and the clutch spring omitted.

FIGS. 1 and 2 illustrate the relevant details of a friction clutch 1 which comprises a housing 2 and a pressure plate 3. The latter is compelled to rotate with the housing 2 about a common axis X-X but has a limited freedom of movement relative to the housing 2 in the direction of such axis, namely toward and from more or less pronounced frictional engagement (or no engagement) with the adjacent set of friction linings 7 of a rotary clutch disc or clutch plate 8 serving to transmit torque to and from the input shaft of a transmission (not shown) when the clutch 1 is at least partially engaged.

The housing 2 receives torque from a counterpressure plate 6 which is secured thereto by suitable fasteners (not specifically shown) and includes a substantially radially extending portion or wall which receives torque from a rotary output element (such as a camshaft or a crankshaft) forming part of a prime mover (such as an internal combustion engine) in a motor vehicle. The manner in which the counterpressure plate 6 is secured to the output element of an engine and in which the hub of the clutch disc 8 is connected with the input element of a transmission is (or can be) the same as disclosed, for example, in U.S. Pat. No. 4,727,970 granted Mar. 1, 1988 to Wolfgang Reik et al. for "Torque transmitting and torsion damping apparatus for use in motor vehicles". The disclosure of this patent is incorporated herein by reference. The counterpressure plate 6 can constitute a one-piece flywheel which is directly affixed to the output element of a prime mover, or it can constitute the secondary flywheel of a composite flywheel (such as disclosed in the U.S. Pat. No. 4,727,970) further including a primary flywheel receiving torque from the output element of the prime mover and transmitting torque to the secondary flywheel by way of one or more dampers.

The means for biasing the pressure plate 3 axially and away from the substantially radially extending rear wall or end wall 2a of the housing 2 comprises a clutch spring 4 which reacts against the housing and bears upon an annular portion 3a of the pressure plate 3. The illustrated clutch spring 4 is a diaphragm spring having a circumferentially complete radially outer resilient portion (main portion) 4a which bears against the pressure plate 3, at least when the friction clutch 1 is engaged, and a radially inner resilient portion composed of a set of tongues or prongs 4b extending from the portion 4a and at least substantially radially inwardly toward the axis X-X and having free end portions or tips 4c. The prongs 4b form part of the means for engaging and disengaging the friction clutch 1. Thus, when the tips 4c are depressed (e.g., by a suitable bearing, not shown) in a direction to the left, as viewed in FIG. 1, the radially outer portion 4a of the clutch spring (diaphragm spring) 4 is tilted relative to the housing 2 at a location radially inwardly of the annular portion 3a of the pressure plate 3. This causes the radially outer portion 4a to change its conicity and to permit an axial movement of the pressure plate 3 away from the counterpressure plate 6, i.e., the bias of the friction surface of the pressure plate 3 upon the adjacent friction linings 7 is reduced or terminated so that the clutch disc 8 can slip relative to the plates 3, 6 (and/or vice versa) or comes to a halt, depending upon the extent of disengagement of the clutch.

The clutch spring 4 is installed in a prestressed condition so that it normally tends to maintain the friction clutch 1 in the engaged condition. The means for tiltably mounting the clutch spring 4 at the inner side of the end wall 2a of the housing 2 includes an annular seat assembly 5.

The illustrated clutch disc 8 carries two sets of friction linings 7 which are contacted by the adjacent friction surfaces of the plates 3 and 6 when the friction clutch 1 is at least partially engaged. The friction linings 7 are most likely to be subjected to extensive wear in response to repeated engagement and disengagement of the friction clutch 1. Additional wear can take place upon the aforementioned friction surfaces of the plates 3 and 6, upon the regions of contact between the annular portion 3a of the pressure plate 3 and the radially outer portion 4a of the clutch spring 4, and upon the regions of contact between the seats 11, 12 of the assembly 5 and the respective sides of the spring 4 radially inwardly of the annular portion 3a.

The clutch disc 8 of FIG. 1 comprises resilient segments 10 which are disposed between the two sets of friction linings 7 and permit or cause some axial movements of the two sets of linings relative to each other during engagement and disengagement of the friction clutch 1 to thus contribute to the smoothness of the clutch engaging and disengaging operations. The resilient segments 10 are optional, i.e., the two sets of friction linings 7 can be mounted on a washer-like radially outer portion of the clutch disc 8 without any freedom of axial movement relative to each other.

The means for transmitting torque from the housing 2 to the pressure plate 3 comprises a set of prestressed leaf springs 9 (one shown in FIG. 1) which extend substantially tangentially of the radially outer portion of the pressure plate and of the adjacent radially outer portion of the housing. The leaf springs 9 tend to move the pressure plate 3 axially in a direction to disengage the friction clutch 1.

The annular seat 12 of the assembly 5 is located between the radially outer portion 4a of the clutch spring 4 and the end wall or bottom wall 2a of the housing 2, and the annular seat 11 of the assembly 5 is disposed opposite the seat 12 at the other side of the radially outer portion 4a and is biased against the portion 4a by an energy storing element 13 which (in the embodiment of FIG. 1) is or includes a diaphragm spring performing the additional function of a sensor forming part of a wear compensating unit 16 acting between the seat 12 and the end wall 2a of the housing 2. The purpose of the unit 16 is to automatically compensate for wear at least upon the friction linings 7 of the clutch disc 8 by shifting the seats 11, 12, the clutch spring 4 and the pressure plate 3 axially and toward the counterpressure plate 6 to an extent which is determined by the sensor 13.

The radially inner end portion 13a of the sensor 13 engages the end wall 2a of the housing 2, and the radially outer portion 13c of this sensor constitutes (i.e., is shown as being of one piece with) the seat 11 of the annular assembly 5. The resilient seat 11 (i.e., the radially outer portion 13c of the sensor 13) is installed in a stressed condition so that it biases the adjacent part of the radially outer portion 4a of the clutch spring 4 toward the end wall 2a of the housing 2, and more particularly against the seat 12.

The sensor 13 further comprises a circumferentially complete main or basic portion 13b which is located between the radially inner portion 13a and the radially outer portion 13c (as seen radially of the axis X-X). The connection between the basic portion 13b and the radially inner portion 13a comprises an annulus of in part radially and in part axially extending arms 13d. These arms cooperate with lugs 14 (see particularly FIG. 2) which constitute suitably displaced portions of the end wall or bottom wall 2a of the housing 2. The configuration of the lugs 14 and of the arms 13d is such that they establish between the end wall 2a and the sensor 13 a separable connection constituting a bayonet mount. Thus, all that is necessary to properly mount the seat 11 (sensor 13) in the housing 2 is to stress the seat 11 axially in a direction toward the end wall 2a, and to thereupon slightly turn the end wall 2a and the sensor 13 relative to each other so that the arms 13d properly engage the adjacent lugs 14.

The means for centering the clutch spring 4 at the inner side of the end wall 2a and for ensuring that the spring 4 is compelled to rotate with the housing 2 comprises a set of rivets 15 which are anchored in the end wall 2a and have shanks extending through slots between the neighboring tongues or prongs 4b of the spring 4. Those portions of the slots between the prongs 4b which receive the shanks of the rivets 15 can be suitably enlarged, and such portions of the slots are preferably located close to the radially outer portion 4a of the clutch spring 4.

The mounting of the sensor 13 in the housing 2 is such that the sensor can exert an at least substantially constant force within a certain range of movements of the clutch spring 4 in the direction of the axis X-X. If the leaf springs 9 are mounted in a prestressed condition, their bias (pull) upon the pressure plate 3 in a direction toward the end wall 2a of the housing 2 is superimposed upon the bias of the sensor 13. In other words, the clutch spring 4 is then biased against the seat 12 with a composite or resultant force including the bias of the sensor 13 and the bias of the leaf springs 9.

The bias of the clutch spring 4 upon the portion 3a of the pressure plate 3 opposes the bias of the leaf spring 9 upon the pressure plate. Thus, when the friction clutch 1 is engaged (i.e., when the two sets of friction linings 7 are clamped by the friction surfaces of the plates 3 and 6), the actual force with which the pressure plate 3 bears upon the adjacent set of friction linings 7 is that which is being applied to the annular portion 3a by the radially outer portion 4a of the spring 4 minus the bias of the leaf springs 9 in a direction to move the pressure plate 3 axially and away from the counterpressure plate 6.

The combined (resultant) bias of the sensor 13 and the leaf springs 9 balances the force which is being applied to the tips 4c of the prongs 4b when the clutch 1 is disengaged so that, at least when the counterpressure plate 6 is not driven by a prime mover and the pressure plate 3 is disengaged from the adjacent set of friction linings 7, there is established an at least substantial state of equilibrium between that force which acts upon the seat 11 (sensor 13) when the clutch 1 is disengaged and the aforementioned resultant force (furnished by the sensor 13 and the leaf springs 9). As already mentioned hereinbefore, the (variable) disengaging force can be applied by a bearing, by a lever or the like which displaces the tips 4c of the prongs 4b in a direction to the left, as viewed in FIG. 1, so that the clutch spring 4 is tilted (between the seats 11 and 12) relative to the end wall 2a and the radially outer portion 4a of the spring 4 moves axially and away from the counterpressure plate 6. The prongs 4b and the aforementioned bearing or lever (or any other suitable means for depressing the tips 4c) constitute the means for engaging and disengaging the friction clutch 1. The magnitude of the disengaging force can vary during different stages of axial movements and in different axial positions of the tips 4c.

The wear compensating unit 16 operates between the end wall 2a of the housing 2 and the seat 12. Its purpose is to ensure that no undesirable clearance or play can develop between the end wall 2a and the seat 12 in response to the development of wear at least upon the friction linings 7 of the clutch disc 8, i.e., the unit 16 is designed to automatically shift the parts 12, 4, 11 and 3 in a direction to the left (as viewed in FIG. 1) through a distance which is commensurate with (proportional to or indicative of) the extent of wear upon the friction linings 7. Consequently, the operation of the friction clutch 1 is not affected (or is not appreciably or unduly affected) by wear upon the parts (mainly or especially the friction linings 7) which are most likely to undergo pronounced wear (namely an amount of wear which could adversely influence the operation of the friction clutch 1) in response to repeated engagement and disengagement of the clutch. The absence of excessive play between the end wall 2a and the seat 12 contributes to a higher efficiency and smoothness and more reliable operation of the friction clutch 1.

The illustrated compensating unit 16 comprises an annular member 17 provided with an array of circumferentially extending ramps 18 which slope in the direction of the axis X-X and abut complementary ramps 19 at the inner side of the end wall 2a of the housing 2. The member 17 is made of a synthetic material, preferably a heat-resistant thermoplastic substance which can be reinforced with fibers (if necessary). For example, the member 17 can be a mass-produced injection molded article.

The complementary ramps 19 of the compensating unit 16 which is shown in FIGS. 1 and 2 are of one piece with the end wall 2a, i.e., they constitute suitably deformed portions of the housing 2. The raised end (as seen in the direction of the axis X-X and toward the counterpressure plate 6) of each complementary ramp 19 is adjacent a port 20a which serves to admit air into the interior of the housing 2 when the counterpressure plate 6 is driven by the prime mover so that the inflowing streams of air cool the plastic member 17 and other component parts within the housing 2. The configuration, locations and dimensions of the ports 20a are selected with a view to ensure adequate cooling of the parts in the interior of the housing 2 when the latter is rotated by the prime mover via counterpressure plate 6 and, in turn, rotates the member 17, the clutch spring 4 and the pressure plate 3.

The slopes (as seen in the direction of the axis X-X) and the lengths (as seen in the circumferential direction of the annular member 17) of the ramps 18, 19 are selected in such a way that a sliding of the ramps 18 relative to the complementary ramps 19 can suffice to invariably ensure adequate axial adjustments of the seat 12 away from the end wall 2a during the useful life of the friction clutch 1, i.e., to compensate for maximum anticipated wear upon the friction linings 7, the friction surfaces of the plates 3 and 6, and the regions of contact between the portion 3a of the pressure plate 3 and the clutch spring 4. The extent of angular movability of the ramps 18 relative to the complementary ramps 19 can be in the range of between about 8° and 60°, particularly between about 10° and 30°.

The slope of the ramps 18 is or can be identical with that of the ramps 19 and can be in the range of between about 4° and 12°. This slope is preferably selected in such a way that the friction between the abutting surfaces of the ramps 18 and 19 is sufficiently high to prevent accidental (unintentional or non-contemplated) angular displacements of the annular member 17 relative to the annulus of ramps 19, i.e., to prevent unnecessary axial shifting of the seat 12, pressure plate 3 and clutch spring 4 away from the end wall 2a.

The compensating unit 16 further comprises means for biasing the annular member 17 in the circumferential direction of the seat 12 so as to urge the ramps 18 to slide along the adjacent complementary ramps 19 when the extent of wear (either initial wear or the wear following a preceding compensation for wear) warrants such automatic angular displacement of the member 17 relative to the housing 2 with attendant axial movement of the member 17 toward the counterpressure plate 6.

The means for biasing the annular member 17 in a direction to turn relative to the end wall 2a of the housing 2 comprises three prestressed coil springs 20 (see FIG. 2) which are preferably equidistant from each other (as seen in the circumferential direction of the member 17), which react against the end wall 2a, and which bear upon the member 17. Each coil spring 20 surrounds a mandrel or core 21 which is a suitably deformed circumferentially extending portion of the end wall 2a, and each such spring 20 is urged against the location where the respective mandrel 21 is of one piece with the major portion of the end wall 2a by the prongs or tines of a fork 23 which is or which can be an integral part of the annular member 17. The mandrels 21 are preferably located in the general plane of the end wall 2a and such mandrels can be obtained by providing the end wall 2a with suitably configurated substantially U-shaped cutouts 22, e.g., in a stamping machine in which a blank (such as a sheet metal blank) is converted into the housing 2. The width of each mandrel 21 is preferably selected in such a way that the respective coil spring 20 is adequately guided in the radial and axial directions. The forks 23 can be of one piece with the annular member 17; their tines 24 straddle the respective mandrels so that they can stress the adjacent coil springs 20 axially by urging them against the junctions between the root portions of the mandrels 21 and the main portion of the end wall 2a. As can be seen in FIG. 1, the tines of the forks 23 extend into the respective U-shaped cutouts 22.

When the friction clutch 1 is new or fairly new (i.e., when the wear upon the friction linings 7 is nil or negligible), the coil springs 20 of the compensating unit 16 are stressed to a maximum extent, i.e., the mutual positions of the ramps 18 on the annular member 17 and the ramps 19 of the end wall 2a are such that the member 17 is closely or immediately adjacent the inner side of the end wall 2a, and the seat 12 is disposed at a maximum axial distance from the counterpressure plate 6.

The sensor 13 is installed between the clutch spring 4 and the pressure plate 3 in such a way that the seat 11 can cover a distance (as seen in the direction of the axis X-X and toward the friction linings 7) which at least equals the maximum axial movement to be carried out by the pressure plate 3 toward the counterpressure plate 6 in order to compensate for wear at least upon the friction linings 7 but preferably also upon the friction surfaces of the plates 3 and 6. The at least substantially linear range of the characteristic curve of the sensor 13 preferably exceeds that value which is necessary to compensate for wear at least upon the friction linings 7 because this renders it possible to at least partially compensate for tolerances which are attributable to assembly of the friction clutch 1.

In order to ensure an optimal operation of the friction clutch 1, and more specifically a reliable, accurate and predictable automatic compensation for wear at least upon the friction linings 7 (but preferably also upon other parts which are subject to wear of a nature capable of being compensated for by shifting the pressure plate 3 axially toward the counterpressure plate 6), the relationship of certain forces which develop in actual use of the friction clutch (and more particularly during disengagement of the clutch when the pressure plate 3 is caused to move away from the counterpressure plate 6) is preferably as follows: The momentary resultant force which is being generated by the resilient segments 10 of the clutch disc 8, by the sensor 13 and by the leaf springs 9 and acts upon the clutch spring 4 (as well as the resultant force furnished only by the sensor 13 and the leaf springs 9 once the friction surface of the pressure plate 3 no longer contacts the adjacent set of friction linings 7) should be at least equal to (but should preferably at least slightly exceed) the clutch disengaging force which is being applied to the tips 4c of the prongs 4b in a direction toward the counterpressure plate 6. The disengaging force being applied to the tips 4c varies, or can vary, as the disengagement of the friction clutch 1 progresses.

As the wear upon the friction linings 7 increases, the axial position of the pressure plate 3 relative to the housing 2 changes, namely the plate 3 moves nearer to the counterpressure plate 6 when the clutch 1 is engaged because the combined thickness of the two sets of friction linings 7 has been reduced to an extent which is proportional to the amount of wear. This entails a change of the conicity of the clutch spring 4 which, in the embodiment of FIGS. 1 and 2, is a diaphragm spring. Such change of conicity results in the application of a different (greater) force upon the pressure plate 3 in the engaged condition of the clutch 1. The change of the bias of the clutch spring 4 entails (at least when the clutch does not rotate about the axis X-X) an interruption of the state of equilibrium which prevailed at the seat 11 between the sensor 13 and the clutch spring 4. This increase of the bias of the clutch spring 4, which is attributable to the wear at least upon the friction linings 7, effects a shifting of the progress of the clutch disengaging force, namely the magnitude of the required disengaging force tends to increase (i.e., the bias of the spring 4 upon the pressure plate 3 tends to increase). Such increase of the disengaging force causes (during disengagement of the friction clutch 1) that the resultant force (furnished by the leaf springs 9 and by the sensor 13 and being applied to the clutch spring 4 at 5) is overcome; the sensor 13 yields at the seat assembly 5 and moves toward the counterpressure plate 6 through a distance which is at least substantially indicative (i.e., a function) of the extent of (initial or additional) wear at least upon the friction linings 7.

As the sensor 13 yields, the clutch spring 4 is tilted at the annular portion 3a of the pressure plate 3 so that the conicity of the spring 4 is changed together with a change of the energy (and hence torque) which is being stored by the spring 4 as well as with a change of the forces which the spring 4 applies to the seat 11 (i.e., to the sensor 13) and to the pressure plate 3. The end result is a reduction of the force which is being furnished by the clutch spring 4, and such reduction continues until the changed bias of the spring 4 again balances and successfully counteracts the combined (resultant) bias which is furnished by the sensor 13 and the leaf springs 9 and is being applied in the direction of the axis X-X.

Once the state of equilibrium is reestablished, the pressure plate 3 is again free to become disengaged from the adjacent set of friction linings 7. During the just discussed stage which is terminated with the reestablishment of the state of equilibrium between the bias of the clutch spring 4 and the combined bias of the leaf springs 9 and sensor 13, the prestressed coil springs 20 of the compensating unit 16 are free to turn the annular member 17 and its ramps 18 relative to the ramps 19 of the end wall 2a. This causes the seat 12 to move axially and away from the end wall 2a through a distance which is commensurate with the extent of wear to thus ensure that the radially outer portion 4a of the clutch spring 4 is held without play between the seats 11, 12 of the assembly 5. Once the compensating action is completed, the operation of the friction clutch 1 is the same as prior to the development of wear or any additional wear.

In actual practice, the adjustments of the axial position of the seat 12 under the action of the compensating unit 16 are incremental or continuous, i.e., the extent of axial adjustment of the position of the seat 12 is small or extremely small but can take place either continuously or at very short intervals (namely as the wear at least upon the friction linings 7 progresses).

As concerns additional details and modifications of wear compensating units which can be utilized in the friction clutch of the present invention, reference should be had to the aforementioned U.S. Pat. Nos. 5,450,934 and 5,409,091 as well as to the commonly owned U.S. patent application Ser. Nos. 08/211,020 and 08/810,674 disclosures of these two U.S. patent applications corresponding are also incorporated herein by reference. The just enumerated patens and patent applications disclose the characteristic curves of clutch springs (such as the clutch spring or diaphragm spring 4), of the sensors (such as the sensor 13), of the resilient means of the clutch disc (such as the segments 10 of the clutch disc 8), and of the leaf springs (such as 9) which can be used with advantage in the friction clutch 1. The aforementioned printed publications further describe satisfactory modes of cooperation between the various resilient components such as can ensure a highly reliable operation of the compensating unit as well as of the entire friction clutch.

It can happen that an automatic compensating unit will carry out adjustments when such adjustments are not warranted by the wear (such as initial or additional wear) at least upon the friction linings of the clutch disc in the friction clutch. For example, when the friction clutch is rotated by a prime mover, such as the combustion engine of a motor vehicle, vibratory movements which are generated by the prime mover and are transmitted by the output element (such as the crankshaft or the camshaft of an engine) to the counterpressure plate of the friction clutch might cause undesirable "adjustments" to compensate for non-existent or insufficient wear. A similar situation can develop when the load upon the vehicle undergoes a very pronounced change, for example, when the operator of the vehicle completely releases or abruptly depresses the gas pedal. A typical situation which can result in undesirable "adjustments" by a wear compensating unit can develop in response to the development of axial oscillatory movements and/or bending or flexing of the output shaft (such as the crankshaft) of the engine in a motor vehicle. Such stray movements are transmitted to the friction clutch. For example, if the friction clutch 1 of FIGS. 1 and 2 is disengaged, axial oscillatory movements of the output shaft which drives the counterpressure plate 6 can cause axial oscillatory movements of the pressure plate 3; this, in turn, causes repeated short-lasting disengagements of the annular portion 3a from the radially outer portion 4a of the clutch spring 4. Consequently, the magnitude of the resultant force generated by the resilient means including the sensor 13 and the leaf springs 9 decreases because the leaf springs 9 no longer continuously (uninterruptedly) urge the annular portion 3a of the pressure plate 3 against the radially outer portion 4a of the clutch spring 4.

When the just outlined situation actually develops, the equilibrium between resultant forces acting upon the clutch spring 4 and the force(s) generated by the clutch spring is destroyed with the result that the compensating unit 16 becomes active at a stage or for reasons not warranting any compensation for wear. Such undesirable or untimely or unnecessary "compensation" for wear can result, among other drawbacks, in an undesirable shifting of the operating range of the clutch spring 4.

Other problems which can arise in connection with the operation of conventional friction clutches employing wear compensating units is that, during certain stages of operation of the engine in a motor vehicle and/or in response to abrupt changes of the position of the gas pedal, the developing pronounced and rapid changes of load upon the motor vehicle can entail the development of very pronounced circumferential accelerations which, due to the inertia of various rotating component parts of the friction clutch, bring about the generation of forces acting at least upon the bulkier component parts. For example, the inertia of the annular member 17 of the compensating unit 16 can result in the development of a force acting in the direction of the axis X-X toward the clutch spring 4 which is felt in the region of the ramps 18, 19 and opposes the resultant force generated by resilient means including the sensor 13.

In accordance with a feature of the present invention, the aforementioned undesirable or untimely compensating action by the unit 16 can be prevented, or its likelihood greatly reduced, if the annular member 17 is capable of properly reacting to changes in rotational speeds, at least within certain critical RPM ranges. The illustrated annular member 17 is capable of expanding radially outwardly, i.e., it can expand (increase its diameter) under the action of centrifugal force. In order to enhance such radial expansion, the illustrated annular member 17 is interrupted at 25 (see FIG. 2) so that it resembles a split ring; this member is preferably made of a resilient material and tends to reduce its diameter, i.e., to reduce the width of the radial slot at 25. In other words, the member 17 automatically contracts when the magnitude of centrifugal force tending to increase its diameter (and hence the width of the slot at 25) decreases.

The housing 2 is provided with abutments 26 for the annular member 17. When the member 17 bears against the abutments 26, it is in a form-locking or frictional locking engagement with the housing 2 and cannot move axially and away from the end wall 2a because its ramps 18 cannot slide relative to the complementary ramps 19 when the clutch 1 is rotated within a certain range of speeds. In other words, the annular member 17 can cooperate with the abutments 26 of the housing 2 to prevent an actuation or operation of the compensating unit 16 when the RPM of the clutch 1 rises above a preselected value.

The illustrated abutments 26 are lugs or tongues which are of one piece with and are bent out of the general plane of the end wall 2a. As mentioned above, the entire housing 2 can be made of a metallic sheet material which can be readily treated in a stamping machine or another suitable machine tool to provide the aforementioned mandrels 21 for the coil springs 20 and/or the abutments 26 for the annular member 17 during making of the housing 2.

The just described ability of the annular member 17 to expand under the action of centrifugal force and to thus prevent an actuation of the wear compensating unit 16 when the RPM of the friction clutch 1 exceeds a preselected threshold value does not or need not interfere with timely actuation of the unit 16 for the purpose of compensating for actually developed wear at least upon the friction linings 7. Thus, any and all necessary adjustments to compensate for wear can take place when the friction clutch 1 does not rotate or rotates within a range of relatively low speeds; at such time, the annular member 17 is out of contact with the abutments 26 or the frictional engagement between the peripheral surface of the member 17 and the abutments 26 is too weak to prevent the coil springs 20 from turning the ramps 18 relative to the adjacent complementary ramps 19 when necessary to compensate for wear.

It is further desirable and advantageous to provide the friction clutch 1 with means for properly centering the annular member at the inner side of the end wall 2a. Such centering means is provided within (i.e., it is surrounded by) the annular member 17 and can also serve as a means for preventing excessive radial contraction of the member 17, e.g., for preventing a complete closing of the slot at 25. Such mode of centering the annular member 17 (which preferably carries or includes or constitutes the seat 12) ensures that the ramps 18 remain in optimum positions relative to the adjacent complementary ramps 19, at least when the unit 16 is ready to compensate for wear. In the friction clutch 1 of FIGS. 1 and 2, the means for centering the annular member 17 from within, and for preventing an excessive radial contraction of this member, includes the aforementioned rivets 15 which hold the clutch spring 4 against rotation relative to the housing 2. The annular member 17 includes circumferentially extending followers 17a in the form of arcuate rails or the like; such followers 17a normally abut the shanks of the adjacent rivets 15 and thus not only center the member 17 relative to the housing 2 but also prevent an excessive radial contraction of the member 17 (such as would prevent the ramps 18 from assuming optimum positions relative to the adjacent (abutting) complementary ramps 19).

It is also possible to select the distances between the rivets 15 and the axis X-X, and/or the configuration of the followers 17a, and/or the tendency of the member 17 to contract, in such a way that the rivets 15 cooperate with the adjacent followers 17a to prevent a turning of the ramps 18 relative to the adjacent complementary ramps 19 when the friction clutch 1 does not rotate or while the RPM of the friction clutch is below a preselected lower threshold value. At the same time, the abutments 26 of the housing 2 prevent a turning of the member 17 relative to the end wall 2a when the RPM of the friction clutch 1 rises to or exceeds a predetermined upper threshold value. In other words, the arrangement can be such that the unit 16 can perform its intended function only within a predetermined range of rotational speeds of the friction clutch 1, namely between the aforementioned lower and upper threshold values.

The just described ability of a radially expandible and contractible annular member of a wear compensating unit to limit and/or select the range of rotational speeds at which a compensation for wear can take place is disclosed, for example, in U.S. Pat. No. 5,641,048 to which reference may be had, if necessary. The disclosures of any U.S. is also intended to be incorporated herein by reference.

When the friction clutch 1 is put to use in the power train between the combustion engine and one or more driven aggregates in a motor vehicle, the nature of the power train can be such that, during certain stages of operation or utilization of the vehicle, the pressure plate 3 is caused to perform low-amplitude, high-frequency oscillations. For example, such situations are particularly likely to develop during engagement and/or during disengagement of the friction clutch, i.e., while the friction linings 7 are caused or permitted to slip relative to the plates 3, 6 and/or vice versa. Otherwise stated, such situations can develop when the friction clutch is only partially engaged so that it merely transmits a partial torque, either from the engine to the wheels or in the opposite direction (depending upon whether the vehicle is pulling a load or is coasting).

The just discussed high-frequency, low-amplitude oscillations or vibrations of the friction clutch are or can be transmitted to other component parts of the power train. For example, if such vibrations overlap with the characteristic vibrations of the power train, the latter can generate readily detectable and highly undesirable noises and/or oscillations of an amplitude and/or frequency which are shared by the entire motor vehicle and are (or can be) a cause of considerable discomfort to the occupant or occupants.

In fact, the pressure plate 3 can be caused to carry out relatively high-frequency and relatively low-amplitude vibrations when the friction clutch 1 is fully disengaged, and such vibrations can entail the development of several undesirable phenomena such as (and particularly or at least) noise. The reason is that such vibrations of the pressure plate 3 are communicated to the cover or housing 2 of the friction clutch.

In order to avoid (or to at least reduce the likelihood of the development of) such stray movements of the pressure plate 3, the friction clutch 1 of FIGS. 1 and 2 further comprises means 27 for damping the oscillations of the pressure plate. The illustrated damping means 27 (hereinafter called damper for short) comprises suitably curved tongue-like resilient portions or protuberances 13e which are or which can be of one piece with the sensor 13 (i.e., the latter can be said to form part of the damper 27 or vice versa) and which tend to move radially outwardly and thus bear against a substantially cylindrical portion or section 3b of the pressure plate 3. The protuberances 13e extend substantially in the direction of the axis X-X. The engagement between the protuberances (resilient portions) 13e of the damper 27 and the surface of the portion 3b of the pressure plate 3 is a rather pronounced frictional engagement which can oppose stray radial and/or axial movements of the pressure plate 3 relative to the sensor 13 and clutch spring 4.

The surface of the frictionally engaged portion 3b of the pressure plate 3 can be an unfinished or a relatively unfinished surface (to thus enhance the frictional engagement with the protuberances 13e), or an at least partially or highly finished surface (e.g., a precision finish can be imparted by one or more tools in a turning, polishing or other suitable machine). A precision finish reduces the range of tolerances (namely the ability of the pressure plate 3 to perform undesirable stray movements relative to the sensor 13). The degree or extent of finish of the frictionally engaged surface of the portion 3b will depend upon the finish and/or the radial bias and/or stiffness of the protuberances 13e and/or upon the desired degree of damping stray movements of the pressure plate 3.

During disengagement of the friction clutch 1, the pressure plate 3 and its portion 3b move axially and away from the counterpressure plate 6, i.e., toward the end wall 2a of the housing 2. However, the rigidity and mounting of the sensor 13, and particularly of its protuberances 13e, are such that the protuberances 13e do not share the axial movement of the portion 3b, i.e., the portion 3b slides (with axial friction) relative to the protuberances 13e. Thus, the damper 27 generates an axial frictional force the magnitude of which is a function of the friction coefficient between the protuberances 13e and the portion 3b as well as of the extent of radial prestressing of the protuberances 13e. It has been found that such frictional force can effectively and reliably damp or at least greatly reduce the vibrations of the pressure plate 3 to thus ensure that the operation of the friction clutch 1, as well as of the motor vehicle embodying such friction clutch, is much more satisfactory than in the absence of the damper 27 or an equivalent damping device.

In order to ensure the generation of a satisfactory frictional force, it is necessary that the protuberances 13e do not share the axial movements of the pressure plate 3 during disengagement of the friction clutch 1. This is achieved by ensuring that the protuberances 13e exhibit a pronounced resistance (stiffness) against movements in the direction of the axis X-X. For example, such resistance can be in the range of 1000N/mm. As concerns the stressing of the protuberances 13e in directions radially of the axis X-X, the force with which such protuberances are biased against the unfinished, partly finished or highly finished surface of the portion 3b of the pressure plate 3 (such force also determines the frictional force of the damper 27) can be in the range of about 1000N.

While the tips 4c of the prongs 4b are being depressed toward the counterpressure plate 6 to disengage the friction clutch 1, the frictional force then being generated by the damper 27 opposes (acts counter to) the force which is generated by the leaf springs 9, namely a force which tends to move the pressure plate 3 axially and away from the counterpressure plate 6, i.e., the force exerted upon the pressure plate 3 by the leaf springs 9 in a direction to disengage the friction clutch 1 is opposed or weakened by the frictional force of the damper 27. Consequently, and in order to ensure that the friction clutch 1 will be disengaged when necessary (namely when the application of force to the tips 4c of the prongs 4b is to result in a predictable axial movement of the pressure plate 3 away from the counterpressure plate 6), the bias of the leaf springs 9 must be increased by a value at least approximating the frictional force of the damper 27, i.e., the force acting between the protuberances 13e and the confronting surface of portion 3b of the pressure plate 3.

Another possibility of ensuring a reliable disengagement of the friction clutch 1 is to directly or indirectly couple the clutch spring 4 to the pressure plate 3. This modification is shown in FIG. 3.

The frictional force which is generated by the damper 27 is transmitted by the clutch spring 4 directly to the seat assembly 5; this is desirable and advantageous because it ensures that the frictional force cannot influence (or does not appreciably influence) the operation of the wear compensating unit 16. Otherwise stated, the frictional force generated by the damper 27 and acting between the protuberances 13e and the pressure plate portion 3b cannot unduly influence the sensor 13 which is part of the wear compensating unit 16. In fact, the protuberances 13e of the damper 27 which is shown in FIG. 1 can be said to form part of the unit 16 because they are of one piece with the sensor 13.

The friction clutch 1 can be modified in a number of ways without departing from the spirit of the invention; for example, this friction clutch can embody at least some of the features which are disclosed in the aforementioned U.S. Pat. Nos. 5,450,934 and 5,409,091 and U.S. patent application Ser. Nos. 08/211,020 and 08/810,674. For example, these patents and patent applications disclose optimal or highly satisfactory characteristic curves of the clutch spring 4, the sensor 13 (and more particularly of the diaphragm spring constituting or forming part of the sensor), the resilient segments 10 of the clutch disc 8, and the leaf springs 9. These patents and patent applications further describe and illustrate numerous presently preferred modes of cooperation between various resilient elements which modes contribute to a highly satisfactory or optimal operation of the wear compensating unit as well as of the entire friction clutch.

Figure 3:
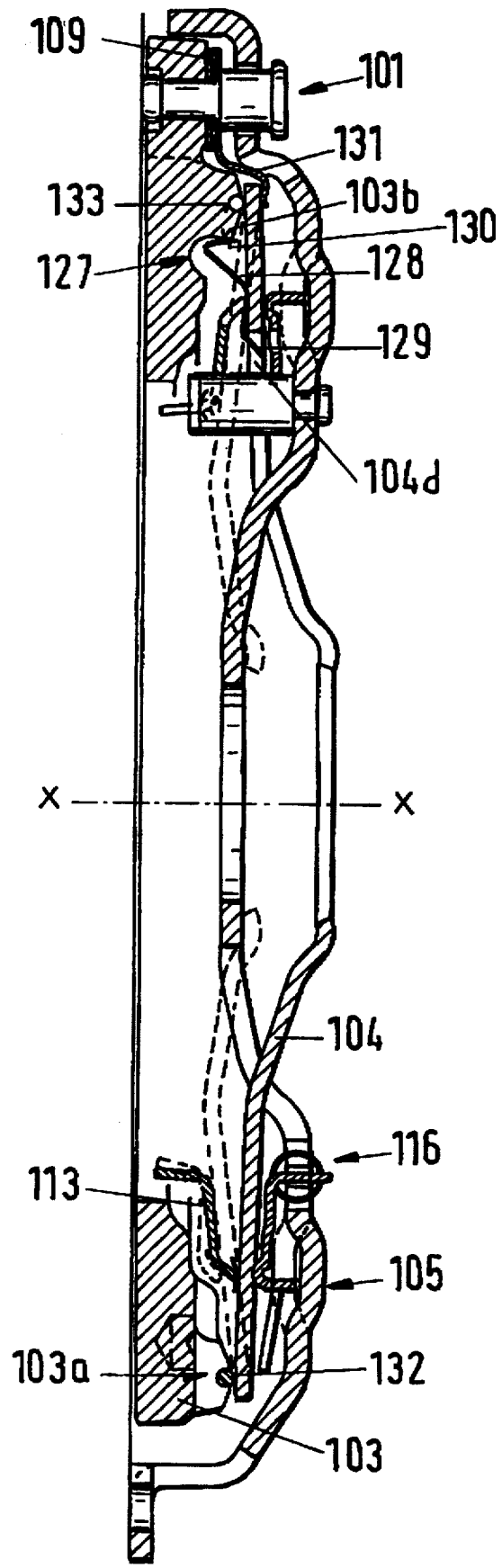
FIG. 3 is an axial sectional view of a portion of a modified friction clutch.

FIG. 3 shows a portion of a modified friction clutch 101. Unless otherwise stated, all such parts of the friction clutch 101 which are identical with or clearly analogous to certain parts of the friction clutch 1 of FIGS. 1 and 2 are denoted by similar reference characters plus 100.

The damper 127 of the friction clutch 101 comprises an intermediate member 128 (hereinafter called insert for short) which is or which can be made of a metallic sheet material. The insert 128 corresponds to the protuberances 13e, i.e., it bears upon the finished, partly finished or unfinished surface of the portion 103b of the axially movable pressure plate 103. An annular portion of the insert 128 is held between the clutch spring 104 (e.g., a diaphragm spring) and the sensor 113 (e.g., a diaphragm spring). The means for confining the insert 128 to rotation with the clutch spring 104 comprises bent-over radially inner portions or pojections 129 forming part of the insert and extending axially into adjacent windows 104d of the clutch spring.

The radially outer portion of the insert 128 comprises a set of radially extending resilient tongues or prongs 130 which are stressed, i.e., they tend to move radially outwardly and thus bear against the portion 103b of the pressure plate 103.

The radial force which the prongs 130 apply to the portion 103b of the pressure plate 103 can be in the range of, e.g., 1000N. Furthermore, the prongs 130 exhibit a resistance (stiffness) against shifting in the direction of the axis X-X, e.g., a resistance in the range of not less than 1000N/mm. This ensures that, when the friction clutch 101 is being disengaged, the prongs 130 do not move axially, i.e., they do not share the axial movement of the pressure plate 103 away from the counterpressure plate (not shown in FIG. 3).

The friction clutch 101 further comprises yokes 131 which serve as a means for coupling the pressure plate 103 to the clutch spring 104 to thus ensure (or to further ensure) that the pressure plate 103 will move away from the counterpressure plate during disengagement of the friction clutch regardless of the presence or absence of the bias of the leaf springs 109. Of course, the yokes 131 can be omitted (or can constitute a mere safety feature) if the bias of the leaf springs 109 is selected in a manner as already described with reference to the leaf springs 9 in the friction clutch 1 of FIGS. 1 and 2.

The friction clutch 101 is also constructed in such a way that the damper 127 cannot undesirably affect (either at all or at least to any noticeable extent) the operation of the wear compensating unit 116. The reason is that the axial frictional force generated by the damper 127 is taken up by the clutch spring 104 in the region of the seat assembly 105.

The clutch spring 104 biases the pressure plate 103 by way of an annular component 132 which extends in part into a circular recess or groove 133 in the portion 103a of the pressure plate 103. The annular component 132 is disposed radially outwardly of the seat assembly 105. In the embodiment of FIG. 3, the annular component 132 is a piece of round wire which has a circular cross-sectional outline and the ends of which are but need not be welded or otherwise secured to each other, i.e., it is possible to employ a component 132 which is a split ring. It is also possible to employ a component 132 which is assembled of two or more interconnected or non-connected arcuate constituents.

An advantage of the component 132 (which is preferably hardened to resist wear in response to continuous in part rubbing contact with the circumferentially complete radially outer portion of the clutch spring 104) is that the entire pressure plate 103 need not be made of a high-quality (particularly highly wear-resistant) material. For example, the component 132 can be made of (or can be coated with) a first material which is strongly resistant to wear, and the pressure plate 103 can be made of an entirely different second material which should resist wear in the region of contact of its friction surface with the adjacent set of friction linings (not shown in FIG. 3) and/or in the region of the portion 103b, i.e., along the finished, partly finished or unfinished internal surface which is contacted by the radially elastic tongues or prongs 130 forming part of the damper 127 for the pressure plate 103.

It is clear that a component corresponding to that shown at 132 in the friction clutch 101 of FIG. 3 can be utilized with equal or similar advantage between the pressure plate portion 3a and the radially outer portion 4a of the clutch spring 4 in the friction clutch 1 of FIGS. 1 and 2. Analogously, the component 132 and the groove 133 can be omitted if the portion 103a is adequately hardened and/or otherwise treated (e.g., coated) to avoid excessive wear during the useful life of the friction clutch 101.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of friction clutches and therefore, such adaptations should and are intended to be comprehended within the meaning and range of equivalence of the appended claims.

What is claimed is:

1. An engageable and disengageable friction clutch comprising a housing; a counterpressure plate rotatable with said housing about a common axis; a pressure plate rotatable with said housing and having a limited freedom of movability between said housing and said counterpressure plate in the direction of said axis; at least one clutch spring at least indirectly reacting against said housing and arranged to bias said pressure plate axially toward said counterpressure plate to clamp a rotary clutch disc between said plates in the engaged condition of the clutch; means for engaging and disengaging the clutch, at least one of said plates and said clutch disc being subject to wear in response to repeated engagement and disengagement of the clutch; means for compensating for said wear including means for shifting said pressure plate relative to said housing; and means for damping the movements of said pressure plate in the direction of said axis.

2. The friction clutch of claim 1, wherein said counterpressure plate has means for receiving torque from a prime mover of a motor vehicle.

3. The friction clutch of claim 1, wherein said clutch disc includes friction linings which are contacted by said plates at least in the engaged condition of the clutch and are subject to wear in response to repeated engagement and disengagement of the clutch.

4. The friction clutch of claim 1, wherein said means for damping comprises at least one friction damper.

5. The friction clutch of claim 1, wherein said at least one clutch spring includes a diaphragm spring.

6. The friction clutch of claim 5, wherein said diaphragm spring includes resilient portions forming part of said means for engaging and disengaging the clutch.

7. The friction clutch of claim 6, wherein said diaphragm spring further includes a circumferentially complete radially outer portion arranged to bias said pressure plate at least in the engaged condition of the clutch, said resilient portions including prongs extending from said radially outer portion substantially radially inwardly toward said axis.

8. The friction clutch of claim 5, wherein said diaphragm spring includes a radially outer portion bearing upon said pressure plate at least in the engaged condition of the clutch, and further comprising a seat assembly tiltably mounting said diaphragm spring on said housing radially inwardly of said radially outer portion.

9. The friction clutch of claim 1, further comprising a seat assembly movably mounting said at least one clutch spring in said housing and including at least one component forming part of said compensating means.

10. The friction clutch of claim 9, wherein said seat assembly includes a plurality of seats for said at least one clutch spring, one of said seats including said at least one component and said at least one component including a resilient sensor of said compensating means.

11. The friction clutch of claim 9, wherein said at least one component includes a diaphragm spring.

12. The friction clutch of claim 1, wherein said means for damping comprises a resilient sensor forming part of said compensating means.

13. The friction clutch of claim 12, wherein said resilient sensor includes tongues.

14. The friction clutch of claim 13, wherein said tongues abut a portion of said pressure plate.

15. The friction clutch of claim 1, wherein said means for damping comprises an insert provided in said housing and contacting said pressure plate.

16. The friction clutch of claim 15, wherein said insert consists at least in part of a metallic sheet material.

17. The friction clutch of claim 15, wherein said insert includes prongs.

18. The friction clutch of claim 17, wherein said prongs are resilient and are installed in said housing in a prestressed condition as seen radially of said axis and bear upon said pressure plate.

19. The friction clutch of claim 15, wherein said insert is disposed between said at least one clutch spring and a resilient sensor of said compensating means.

20. The friction clutch of claim 15, further comprising means for confining said insert to rotation with said housing.

21. The friction clutch of claim 20, wherein said means for confining comprises at least one projection provided on said insert.

22. The friction clutch of claim 21, wherein said at least one projection extends into a window of said at least one clutch spring, and further comprising means for non-rotatably coupling said at least one clutch spring to said housing.

23. The friction clutch of claim 1, wherein said means for damping includes a resilient portion which is stressed substantially radially of said axis and bears upon said pressure plate with a force of between about 200 and 2000N.

24. The friction clutch of claim 23, wherein said force is between about 400 and 1000N.

25. The friction clutch of claim 1, wherein said means for damping includes portions engaging said pressure plate and exhibiting a resistance to deformation in the direction of said axis.

26. The friction clutch of claim 25, wherein said means for damping comprises an insert including said pressure plate engaging portions and constituting a diaphragm spring.

27. The friction clutch of claim 25, wherein said means for damping comprises a substantially cupped insert including said pressure plate engaging portions.

28. The friction clutch of claim 25, wherein said pressure plate engaging portions have a stiffness sufficient to resist deformation by a force in excess of 500N.

29. The friction clutch of claim 1, wherein said means for damping includes at least one portion contacting an unfinished portion of said pressure plate.

30. The friction clutch of claim 1, wherein said means for damping includes at least one portion contacting a finished portion of said pressure plate.

31. The friction clutch of claim 30, wherein said portion of said pressure plate is finished as a result of treatment by at least one turning tool.

32. The friction clutch of claim 1, further comprising at least one leaf spring connecting said pressure plate for rotation with said housing.

33. The friction clutch of claim 32, wherein said at least one leaf spring is stressed to bias said pressure plate in the direction of said axis away from engagement with said clutch disc.

34. The friction clutch of claim 33, wherein said at least one leaf spring is arranged to bias said pressure plate with a first force and said means for damping includes means for generating a frictional force acting upon said pressure plate at least substantially in parallel with said first force.

35. The friction clutch of claim 1, further comprising resilient means for maintaining said pressure plate at least substantially out of contact with said clutch disc in the disengaged condition of the clutch.

36. The friction clutch of claim 35, wherein said resilient means comprises at least one leaf spring non-rotatably connecting said pressure plate with said housing and at least one yoke acting upon said pressure plate at least substantially in parallel with said at least one leaf spring.

37. The friction clutch of claim 35, wherein said resilient means bears directly against said at least one clutch spring.

38. The friction clutch of claim 1, further comprising a discrete substantially annular component interposed between said pressure plate and said at least one clutch spring.

39. The friction clutch of claim 1, wherein said means for damping includes means for frictionally engaging said pressure plate with a force which is taken up by said at least one clutch spring.

* * * * *